United States Patent [19]

Coetzer et al.

[11] 4,267,242

[45] May 12, 1981

[54] ELECTROCHEMICAL CELL

[75] Inventors: Johan Coetzer; Michael M. Thackeray, both of Pretoria, South Africa

[73] Assignee: South African Inventions Development Corp., Pretoria, South Africa

[21] Appl. No.: 85,999

[22] Filed: Oct. 18, 1979

[30] Foreign Application Priority Data

Oct. 23, 1978 [ZA] South Africa ............... 78/5950

[51] Int. Cl.³ .............................................. H01M 4/36
[52] U.S. Cl. .................................. 429/104; 429/191; 429/199; 429/219; 429/220
[58] Field of Search ............... 429/101, 104, 191, 199, 429/218, 219, 220

[56] References Cited

U.S. PATENT DOCUMENTS

| 2,933,546 | 4/1960 | Weininger | 429/104 |
| 3,653,968 | 4/1972 | Louzos | 429/191 |
| 3,765,949 | 10/1973 | Butherus | 429/191 |
| 4,105,807 | 8/1978 | Arora | 429/191 X |
| 4,136,233 | 1/1979 | Eisenberg | 429/191 X |
| 4,164,608 | 8/1979 | Coetzer | 429/50 |

Primary Examiner—Charles F. LeFevour
Attorney, Agent, or Firm—Arnold, White & Durkee

[57] ABSTRACT

An electrochemical cell comprising an anode, a cathode and a solid electrolyte, and a battery made up of a plurality of such cells. The anode comprises silver or copper or alloys or amalgams thereof. The cathode is a molecular sieve carrier having a pore size of less than 1 micron and having a halogen, a chalcogen or phosphorous sorbed tnerein. The electrolyte is a multiple salt system having a silver or copper halogenide as a component thereof.

25 Claims, 3 Drawing Figures

ELECTROCHEMICAL CELL

This invention relates to an electrochemical cell.

According to the invention there is provided an electrochemical cell comprising an anode, a solid electrolyte and a cathode, the anode comprising silver, a silver amalgam, or a silver alloy, or copper, a copper amalgam or a copper alloy, the cathode comprising an electronegative element selected from the group consisting of the halogens, the chalcogens and phosphorus sorbed in a molecular sieve carrier having a pore size of less than 1 micron, and the solid electrolyte comprising a double or multiple salt system having a silver or copper halogenide as one of its components.

The anode may conveniently be in the form of an amalgamated silver or copper disc, a pure silver or copper disc, or silver or copper in finely dispersed or powdered form. The use of an amalgam can act to reduce polarization effects at the anode.

In an embodiment of the invention, the anode may comprise silver or copper mixed with solid electrolyte power to reduce contact resistance between the anode and the electrolyte during use.

The electronegative element may thus be selected from the group consisting of chlorine, bromine, iodine, fluorine, sulphur, selenium, tellurium and phosphorus, the molecular sieve carrier being capable of holding the electronegative element captive during operation of the cell to combat significant loss of electronegative element and to combat degradation of the electrolyte.

In an embodiment of the invention, the electronegative element may conveniently be in the form of chlorine, iodine or sulphur.

In an embodiment of the invention, the cathode may include solid electrolyte to reduce contact resistance between the cathode and the electrolyte during use. The solid electrolyte may be in powder form mixed therein.

The molecular sieve carrier may conveniently be such that the electronegative element when sorbed therein, will be held therein in finely dispersed form and preferably in atomic, molecular, atomic cluster or molecular cluster form to present its greatest availability for electrochemical activity during use.

Molecular sieve carriers have molecular cavities in the form of cages, pores or channels, with the cavities having windows leading to them.

The window sizes of the carrier should therefore be sufficiently large to permit entry of the electrochemically active substance into the cavities, and the cavities must be such that the electrochemically active substance can be held captive therein. Thus the pores of the molecular sieve carrier are preferably less than 0,1 micron in size.

To operate effectively the cathode must permit appropriate ions to diffuse therethrough during use in the cell.

It follows that the molecular sieve carrier must therefore act as an ionic conductor when doped with the electronegative element.

By "doped molecular sieve carrier" is meant that the carrier has the electronegative element sorbed therein in accordance with this invention.

In general, the higher the ion conductivity of the cathode, the better will be the performance of the cell using such cathode.

It follows automatically that, to operate effectively as a cathode, the cathode must be electron conductive. In this regard it should be noted that natural and synthetic zeolites are, in general, poor electron conductors.

The molecular sieve carrier may therefore be selected so that it is sufficiently electron conductive, or so that it is sufficiently electron conductive when it has an effective quantity of the electronegative element sorbed therein.

If this is not the case, an electron conductive material must be included in the cathode. This aspect will be discussed in more detail below.

Various types of natural and synthetic molecular sieve materials are known and they are widely used in industry for purification, scavenging and separation.

Because of the demand for these materials, they are being thoroughly investigated and new molecular sieve materials are being developed and manufactured throughout the world.

By taking into consideration factors such as pore size, window size, cavity size, uniformity of pore, window and cavity size, the ability to sorb an electrochemically effective quantity of the electronegative element, and the ability to hold such element captive under operating conditions, a rough guide will be provided for the selection of molecular sieve carriers for particular applications in accordance with this invention.

Further factors which can serve as a guide, can be the degree of porosity, the density, the availability, the mechanical strength, the stability and the electron conductivity of a doped molecular sieve material.

On the basis of factors such as these, molecular sieve materials selected from the group consisting of carbon molecular sieves (excluding intercalation compounds of graphite which will not operate effectively as molecular sieve carriers in the context of this invention), composite carbon molecular sieves, and certain sorbent (natural or synthetic mineral) substances such as zeolites. In this context "zeolites" includes modified zeolites, and zeolite-like substances which exhibit the necessary molecular sieve properties required for the invention.

In an embodiment of the invention, when the molecular sieve carrier is zeolite, it may, as mentioned hereunder, comprise a natural or synthetic zeolite, or a modified zeolite which has been physically or chemically modified but still possesses appropriate molecular cavities for receiving and retaining the electronegative element.

The term "zeolites" is meant to include the class of crystalline or amorphous natural or synthetic materials which contain aluminum and silicon in fairly definite proportions, and their analogues. The term includes natural and synthetic zeolites and is also meant to include modified zeolites which have been physically and/or chemically modified, and zeolite-like substances. For a more detailed discussion of zeolites reference can be made to the January 1975 publication of the International Union of Pure and Applied Chemistry entitled "Chemical Nomenclature, and Formulation of Compositions, of Synthetic and Natural Zeolites".

Zeolites contain sorbed water molecules which may be removed, usually reversibly, by heat and/or evacuation. Since electrochemical cells incorporating cathodes in accordance with this invention will usually not work effectively in the presence of even minor proportions of water, all references to zeolite molecular sieve carriers in this specification are to be regarded as reference to dehydrated or at least partially dehydrated zeolite molecular sieve carriers.

Zeolites are usually possessed of a reasonably ordered internal structure, exhibit a high internal surface area and are characterised by the presence of a multiplicity of regular arrays of molecular cavities.

It is believed that zeolites in their hydrated form can be represented by the following structural formula:

$$M_{2/n}O.Al_2O_3.XSiO_2.YH_2O$$

Where M is a cation of n valence; and X and Y are independent variables that are a function of the composition of the starting mixture, and the manner of formation.

In an embodiment of the invention, the molecular sieve carrier may comprise at least partially dehydrated zeolite crystals. The molecular sieve carrier may thus be selected from the group of naturally occurring or synthetic zoelites consisting of faujasite, erionite, zeolite 3A, zeolite 4A, zeolite 5A and zeolite 13X, or the like structures.

Zeolite 4A has the structural formula:

$$Na_{12}((AlO_2)_{12}(SiO_2)_{12}).XH_2O$$

wherein the value of X can vary.

Zeolite 4A has a window diameter of about 4 Angstrom units and a cavity volume of about 1000 cubic Angstrom units.

Zeolite 13X has the structural formula:

$$Na_{86}(AlO_2)_{86}(SiO_2)_{106}.XH_2O$$

where X can vary over a wide range. Zeolite 13X has molecular cavities with diameters of about 13 Angstrom units.

On the basis of the selection factors as previously discussed which can serve as a guide for selecting the molecular sieve carrier, it would be expected that zeolite 4A would be an appropriate carrier.

It has been found that suitable zeolite crystals should have a sufficiently high physical strength for effective use in the cathode. In addition, it has been found that zeolite crystals which have been doped with an electronegative element should be sufficiently resistant to electrochemical damage during use, and preferably during repeated use, as a cathode in a cell.

Thus physical or electrochemical failure of doped zeolite crystals of the cathode should not be factors which contribute significantly, if at all, towards failure of the cell.

It should be noted that the metal cation of zeolites, whether doped or undoped, can generally be substituted by other cations in an ion-exchange process.

If such ion-exchanged zeolites were to be employed as cathodes in cells, with the substitute cations constituting the primary, and indeed only, electrochemical reactants of the cathodes, the cathodes will tend to collapse physically and/or chemically during use of the cells. This is due to the fact that the ion-exchanged zeolites form an integral part of the cathodes.

The collapse of the cathode will therefore be a major contributing factor towards failure of such a cell which employs such an ion-exchanged zeolite as a cathode. In addition, such collapse will combat effective recharging of such a cell, thus making it entirely impractical for use as a secondary cell.

This is in direct contrast with the instant invention where the zeolite molecular sieve carrier is designed to constitute an inert frame or skeleton for the cathode and does not partake in the electrochemical reaction. It is therefore designed to remain physically and electrochemically stable so that it does not collapse significantly as a result of the electrochemical reaction during normal use.

This aspect should therefore be borne in mind in selecting the particular molecular sieve carrier for use with a selected electronegative element in carrying out this invention.

It should further be noted that in the case of some zeolites incidental cation exchange may occur during use of the cathode of this invention in some electrochemical cells. Thus, for example, $Ag^+$ ions in an electrolyte can replace some sodium ions in a basic zeolite 4A lattice. Such reactions are well known and merely change the sizes of the windows and pores of the zeolite lattice. For example, if sodium ions are replaced by potassium ions in zeolite 4A, zeolite 3A is produced with the window sizes decreasing from 4 Angstrom units to 3 Angstrom units.

Where the zeolite molecular sieve carriers of the cathodes of this invention are in the form of modified zeolites, they are such that while physically or chemically modified, they still possess appropriate molecular cavities for receiving and retaining the electronegative elements, and still possess pores which lead to the cavities and which have diameters of less than about 70 to 100 Angstrom units, and conveniently less than about 30 to 50 Angstrom units.

Where the zeolite molecular sieve carriers of this invention are in the form of zeolite-like substances, the zeolite-like substances are those which have cavities for receiving and retaining the electronegative elements, and which have pores leading to the cavities, with the pores having diameters of less than about 70 to 100 Angstrom units, and conveniently less than about 30 to 50 Angstrom units.

In an embodiment of the invention, the modified zeolites and the zeolite-like substances may conveniently be those having pore sizes of less than about 20 Angstrom units.

The zeolite molecular sieve carrier should preferably be such that it will hold an effective amount of electrochemically active substance captive for a sufficient period to allow the cathode to operate effectively in a cell for a reasonable period.

Conveniently, however, the carrier may be such that the electrochemically active substance will be held captive during use of the cathode in a cell for which it was designed, throughout the normal operating temperature range of the cell, and without significant loss thereof during an appropriate operating period for the cell.

Applicants believe that these requirements can, in general, be provided by the majority of suitable available natural and synthetic zeolites, so that the specific selection criteria given above will be of importance primarily in the case of modified zeolites and zeolitelike substances.

The cathode of this invention may as mentioned above, where necessary, or when desired, include a suitable electron conductive material to enhance the electron conductivity between individual crystals of the cathode and hence to enhance the electron conductivity of the cathode.

In an embodiment of the invention, the electron conductive material may be any suitable electron conductive material which is effective at the operating temperature of the cell, e.g. carbon in the form of graphite, $MoS_2$, or the like.

Where the electron conductive material is in the form of graphite, it may be in the form of a porous coating on the zeolite molecular sieve carrier crystals, or in the form of a powder mixed with the crystals. By 'porous' is meant a coating that allows free access of the electrolyte into the zeolite pores, cavities or channels.

The graphite layer should be porous and conveniently the proportion thereof should be as low as possible consistent with effective electron conduction during use since graphite can act as an electrolyte barrier to limit electrolyte access to the electrochemically active substance.

In practice therefore the proportion of electron conductive material to molecular sieve carrier, should be selected to provide a desired balance between electrolyte access and electron conductivity during use in a cell.

A further factor is that the total mass of the electron conductive material should be as low as possible to give the maximum energy to weight ratio.

In a series of experiments which were conducted, finely divided graphite in powder form was mixed with undoped zeolite crystals and pellets were formed containing various proportions of graphite and zeolite.

It was found that between about 5 and 30% of graphite had to be added to the zeolite to obtain a sufficiently electron conducting pellet for effective use.

Conveniently, however, substantially greater proportions of powdered graphite may be included if required.

In embodiments of the invention therefore, the cathode may include between 5% and 60% by weight of graphite powder.

For loosely compacted structures it will be appreciated that where the cathode comprises a mixture of graphite powder and zeolite crystals, if the graphite particle sizes are too small, electrolyte movement through the cathode will be retarded during use but electronic conductivity will be improved, and vice versa if the graphite particle sizes are too large. In practice therefore a suitable balance will have to be drawn in this regard.

Instead of using graphite in powder form, a series of experiments were conducted using graphite in the form of colloidal suspension.

In the experiments, relatively low concentrations of the graphite colloidal suspension were used to treat zeolite samples. After drying it was found that the treated zeolite was electron conducting and it is believed therefore that a graphite coating must have been formed on the zeolite crystals.

Zeolite crystals could also be coated with graphite using other techniques such as, for example, vapour phase coating.

In further examples of the invention, the zeolite molecular sieve carrier of this invention may be made electron conducting by cracking organic vapours on the crystal surfaces, cracking resins or pitches which have been mixed with zeolite crystals, cracking metal carbonyl vapours such as, for example, tungsten hexacarbonyl, cracking tetrafuran, or the like.

It follows that where the zeolite molecular sieve carrier is a non-electronic conductor and the sorbed electronegative element is a poor electronic conductor there will be poor utilization of the sorbed active substances and a high internal cell resistance.

These limitations may be overcome by impregnating some of the zeolite molecular sieve carrier cavities with a suitable electrochemically inert current collector (which does not take part in electrochemical action of the cell). This may conveniently be done before sorbing of the electrochemically active substances into the carrier.

The inert current collector may, for example, be in the form of carbon, or the like.

Sorption of the electronegative element into an appropriate molecular sieve carrier may be effected by any conventional means.

Thus, for example, the molecular sieve carrier may be dried or dehydrated at elevated temperature under vacuum for an extended period, and, at the same time, the electronegative element, for example sulphur or iodine, as the case may be, may be dried under vacuum if necessary for an extended period. They may then be mixed under vacuum and maintained at an elevated temperature for a sufficient period to secure adequate sorption of the sulphur or iodine, as the case may be, into the molecular sieve carrier.

In embodiments of the invention the solid electrolyte may, for example, include a double salt comprised of a silver halide and the halide of another cation, for example, an alkali halide, a quaternary amine halide, or the like or a mixture of double or multiple salts.

In specific embodiments of the invention, the solid electrolyte includes a double salt of silver iodide with a compound selected from the group consisting of rubidium iodide, for example, $RbAg_4I_5$, potassium iodide, for example, $KAg_4I_5$, N,N,N,N',N',N'-hexamethyl-1,2-ethylene diamine diodide, for example, $Ag_3I_{39}(C_8H_{22}N_2)_4$, N,N,N,N',N',N'-hexamethyl-1,2-propylenediamine diiodide, for example $Ag_1I_{13}(C_9H_{24}N_2)$, N,N,N,N',N',N'-hexamethyl-1,3-propylenediamine diiodide, for example $Ag_2I_{25}(C_9H_{24}N_2)_2$, N,N,N,N',N'',N'',N''-heptamethyl-N'-hydro-diethylenetriamine triiodide, for example $Ag_{4.4}I_{53}(C_{11}H_{30}N_3)_3$, N,N,N,N',N',N'-hexamethyl-1,4-butylenediamine diiodide, tetramethylammoniumiodide, for example $[(CH_3)_4N]_2Ag_{13}I_{15}$, or mercuric iodide, for example, $Ag_2HgI_4$.

In another embodiment of the invention, the solid electrolyte may, for example, include a double salt comprises of a silver halide and another silver salt containing a different anion, for example, a silver chalcogenide, a silver phosphate, a silver tungstate, or the like.

In specific embodiments of the invention, the solid electrolytes may, for example, include $Ag_3SI$, $Ag_3SBr$, $Ag_7I_4PO_4$, $Ag_{19}I_{15}P_2O_7$ or $Ag_{26}I_{18}W_4O_{16}$.

In another embodiment of the invention the solid electrolytes may include multiple salts comprising halides and chalcogenides, which may comprise silver, copper, mercury or the like.

In specific embodiments of the invention the solid electrolytes may, for example, include $Ag_2Hg_{0.25}S_{0.5}I_{1.5}$, $Ag_{1.85}Hg_{0.40}Te_{0.65}I_{1.35}$, $Ag_{1.80}Hg_{0.45}Se_{0.70}I_{1.30}$ or $Ag_{2.0}Hg_{0.5}Se_{1.0}I_{1.0}$.

In another embodiment of the invention, the solid electrolytes may include double or multiple salts comprising a cuprous halide with a halide and/or chalcogenide or another cation.

In a further embodiment of the invention, the solid electrolyte may include a double salt comprising a cuprous halide and an amine halide.

In specific embodiments of the invention, the solid electrolyte may, for example, include $(C_6H_{12}N_4CH_3)Cu_7Br_8$, $(C_6H_{12}N_4C_2H_5)Cu_7Br_8$ or $(C_6H_{12}N_4H)Cu_7Cl_8$.

It will be appreciated that the solid electrolyte may comprise mixtures of the above double or multiple salts. Thus the electrolyte may include crystals of two or more different double or multiple salts.

As the anode, cathode and electrolyte are all solid components, the cell may conveniently be compacted to form a compressed disc or the like. Compaction of the cell may conveniently take place in one operation.

Compaction of the cell will improve interparticle contact thereby providing for enhanced electron conductivity.

The cell of this invention may be in the form of a self-supporting structure or matrix by being suitably compacted, by being suitably compacted with or supported by a binding agent, by being held in a supporting structure or matrix, by being contained in a suitable cell holder, or the like.

Compaction of the cell can be carried out to provide cell discs or pellets which have sufficient mechanical rigidity to be substantially self-supporting.

Where the discs or pellets have sufficient mechanical rigidity to be self-supporting, they could be used as a cell without any form of holder. Conveniently, however, they may nevertheless still be used in a holder so that even if they do fracture during use, the cathode will still remain largely intact.

When the cathode of this invention is precompacted before cell assembly, the molecular sieve carrier may be compacted before or after the substance has been sorbed therein, but conveniently after the substance has been sorbed therein.

The molecular sieve material or cathode, as the case may be, may for example be compacted by a pressing operation, by a hot pressing operation, by a sintering operation, by a sintering accompanied by a press operation, or the like.

The reason for performing these operations is to optimize volume, increase electron conductivity and to produce a required shape. The choice of the forming process will be defined by:

(a) the nature of the molecular sieve carrier and dopant in terms of its breakdown temperature and mechanical properties, (b) the physical shape/size required, (c) the electrochemical properties required.

It will be appreciated that cells in accordance with this invention can readily be assembled in battery form as may be required. The invention therefore extends to a battery comprising a plurality of associated cells as described herein.

The invention extends also to a battery comprising a plurality of cells as described above, connected together.

The battery may be a primary battery or it may be a rechargeable battery, and the cells may be connected together in series and/or parallel, the cells and connections therebetween to form the battery being selected according to the intended use of the battery.

The invention will now be described, by way of example, with reference to the accompanying diagrammatic drawings, and with reference to certain experiments which have been conducted.

Figure 1:
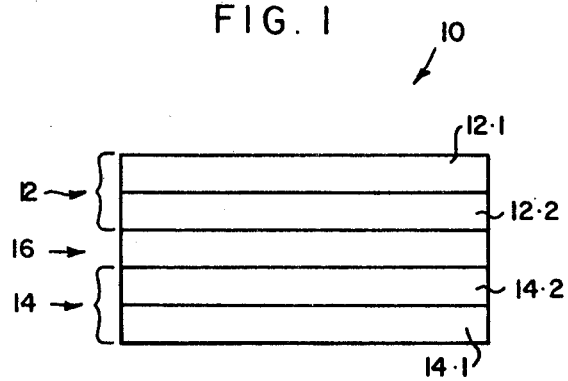
FIG. 1 shows a diagrammatic representation of an electrochemical cell according to the invention.

In FIG. 1 of the drawings, reference numeral 10 generally designates an electrochemical cell according to the invention comprising an anode 12, a cathode 14 and a solid electrolyte 16. The anode 12 is of composite construction and comprises an outer layer 12.1 of silver and an inner layer 12.2 of finely divided silver powder compacted with solid electrolyte in finely divided powder form to ensure intimate contact between the silver and the electrolyte. The cathode 14 is also of composite construction and comprises an outer layer 14.1 of graphite and inner layer 14.2 of zeolite crystals doped with iodine and compacted with solid electrolyte and graphite in finely divided powder form. The solid electrolyte 16 comprises a layer of a double salt of silver iodide and a quaternary amine iodide.

The solid electrolyte of the layers 12.2 and 14.2 is the same electrolyte as that of the layer 16. The various layers are compacted together so that the cell as a whole is in the form of a compressed disc. The disc of the cell itself is housed in a suitable housing (not shown).

The $Ag_{44}I_{53}(C_{11}H_{30}N_3)_3$ solid electrolyte which was used in the experiment was synthetically prepared and polycrystalline.

While this solid electrolyte may be prepared by any conventional method for the experiment conducted it was prepared according to a method of B. B. Owens and G. R. Argue (J. Electrochem. Soc. 117, 898, 1970) as follows: Finely ground powders of AgI and N,N,N,N',N'',N'',N''-heptamethyl-N''-hydro-diethylenetriamine triiodide monohydrate were thoroughly mixed with a few drops of water to form a paste. The mixture was dried under vacuum at 80° C., ground and compressed at 1 kbar into a pellet, 1 cm in diameter, in a stainless steel die. Reaction between the amine iodide salt and AgI was effected by annealing the pellet under a $N_2$ atmosphere at about 130° C. for 20 hours. The pellet was reground, compacted and annealed in the same way a further 3 times. The solid electrolyte material so formed was polycrystalline and was found to be stable under atmospheric conditions for more than 3 years although some discolouration did occur on the surface of the pellets.

Resistance measurements were made on a 1000 Hz conductivity bridge (Model LKB) at room temperature (about 20° C.) using two silver electrodes. The conductivity of the pellet was determined using the standad equation $$\sigma = d/AR$$

where
$\sigma$ = ionic conductivity ($\Omega^{-1}cm^{-1}$)
d = thickness of pellet (cm)
A = cross-sectional area of pellet (cm$^2$)
R = resistance of pellet ($\Omega$)

Contact resistance was reduced by the addition of a thin layer of a mixture of electrolyte and silver powder on either side of the pellet. It was found that the contact resistance could be reduced to 0.5 $\Omega$. The electrical conductivity of $Ag_{44}I_{53}(C_{11}H_{30}N_3)_3$ was determined to be $0,029 \Omega^{-1} cm^{-1}$, and the activation energy for conduction 17,84 kJ mole$^{-1}$, The molecular sieve carrier which was used in the experiment comprises synthetically prepared, dehydrated zeolite 4 A crystals.

While the zeolite crystals may be prepared by any conventional method, for the experiments which were conducted, they were prepared by the method of Charnell, as described for example in the Journal of Crystal Growth 8, 291 (1971).

The zeolite crystals so prepared had an average diameter of about 10 microns.

While there are a number of techniques which may be employed for the sorption of iodine into dehydrated zeolite, the technique should preferably be selected which will provide for the maximum amount of iodine to be sorbed into the dehydrated zeolite.

As far as applicants are aware, one of the most effective techniques is to impregnate dehydrated zeolite from the vapour phase, in which iodine is heated to form a vapour which then comes into contact with and is sorbed by the dehydrated zeolite. The iodine molecules enter the molecular cavities of the zeolite structure in such a way that they do not specifically take the place of any existing atoms or molecules in the zeolite.

While it has been found that sorption of iodine into a dehydrated zeolite may have the effect of slightly distorting the zeolite lattice structure, it is believed, on the basis of the experimental results obtained, that the zeolite retains its physical structure during use of the cathode in a cell and does not break up during normal use.

It has further been found from the experiments conducted, that the doped zeolite crystals in accordance with this invention are resistant to electrochemical damage during repeated use of the cathode in a cell.

There is a clear indication therefore that the metal cations which from an integral part of the undoped zeolite crystals, are not materially affected and do not undergo changes in their oxidation states during use of such doped zeolite crystals as cathodes in cells.

There is therefore a material difference between the doped zeolites of this invention, and reducible metal ion-exchanged zeolite materials.

If such ion-exchanged zeolite materials are used as a cathode in a cell, the reducible metal ion constitutes the electrochemically active element of the cathode. The consequence hereof is that the zeolite will break up physically and/or electrochemically during use leading to failure of the cathode.

While this can be material in the case of a primary cell, it is particularly serious in the case of a secondary (or rechargeable) cell.

For forming the cathode mixture for the various experiments, the prepared zeolite crystals were dehydrated at about 350° C. and $10^{-6}$ Torr for 24 hours. This sample was then mixed with solid sublimed iodine (99,5% pure) under vacuum and maintained at about 175° C. for about 24 hours and then at about 270° C. for 6 hours.

It was found that iodine effectively penetrated the zeolite crystal lattice and was retained within the lattice.

Micrographs taken with a scanning electron microscope of zeolite 4A crystals impregnated with iodine indicated that the zeolite crystals remained intact and that there was no evidence of any surface or unsorbed iodine in the sample. An EDAX analysis indicated the presence of sorbed iodine within the individual crystals of zeolite 4A.

Microanalysis results indicated that 37,0% by weight iodine had been sorbed by the zeolite crystals.

After the iodine had been sorbed into the molecular sieve carrier, the cathode mixture was formed by adding a small amount of dried, purified powdered graphite, and a small amount of $Ag_{44}I_{53}(C_{11}H_{30}N_3)_3$ solid electrolyte, and then thoroughly mixing the cathode mixture 14.2.

For the experiment which was conducted, the cathode mixture 14.2 consisted of 0,75 gm zeolite iodine crystals and the cells had capacities of about 58 mA-hr.

The individual cell was manufactured in pellet form under argon as follows: A thin layer (12.1) of finely divided silver powder was placed in a stainless steel die and gently compressed. Above this was added a layer (12.2) of a mixture of finely divided silver powder and solid electrolyte $Ag_{44}I_{53}(C_{11}H_{30}N_3)_3$ which was then also gently compressed. Following this same procedure individual layers (16 in FIG. 1) of $Ag_{44}I_{53}(C_{11}H_{30}N_3)_3$ and (14.2 in FIG. 1) a mixture of zeolite 4A doped with iodine, $Ag_{44}I_{53}(C_{11}H_{30}N_3)_3$ and graphite and (14.1 in FIG. 1) graphite were added in succession. The whole assembly was then compacted to a pressure of 3 kbar. The surface area of the disc was 7,9 cm$^2$ and the total mass of the pellet was 6,5 gm.

In the experiment which was conducted the cell was clamped between two graphite current collectors and operated at room temperature (about 20° C.) in air.

The results of the experiment which was performed, is set out in Table 1 below. Insofar as the experimental result is concerned, it must be appreciated that this is largely a preliminary result and some variation and improvement would therefore be expected on repetition.

TABLE 1

| | |
|---|---|
| Open circuit voltage (mV) | 680 |
| Short circuit current (mA) | 3,0 |
| Theoretical capacity (mA-hr) | 58,3 |
| Discharge capacity (mA-hr) | 20,0 |
| Cut off limit at end of discharge (mV) | 260. |
| $I_2$ utilization (%) | 34,3 |
| No of working hours (hr) | 136 |

Figure 2:
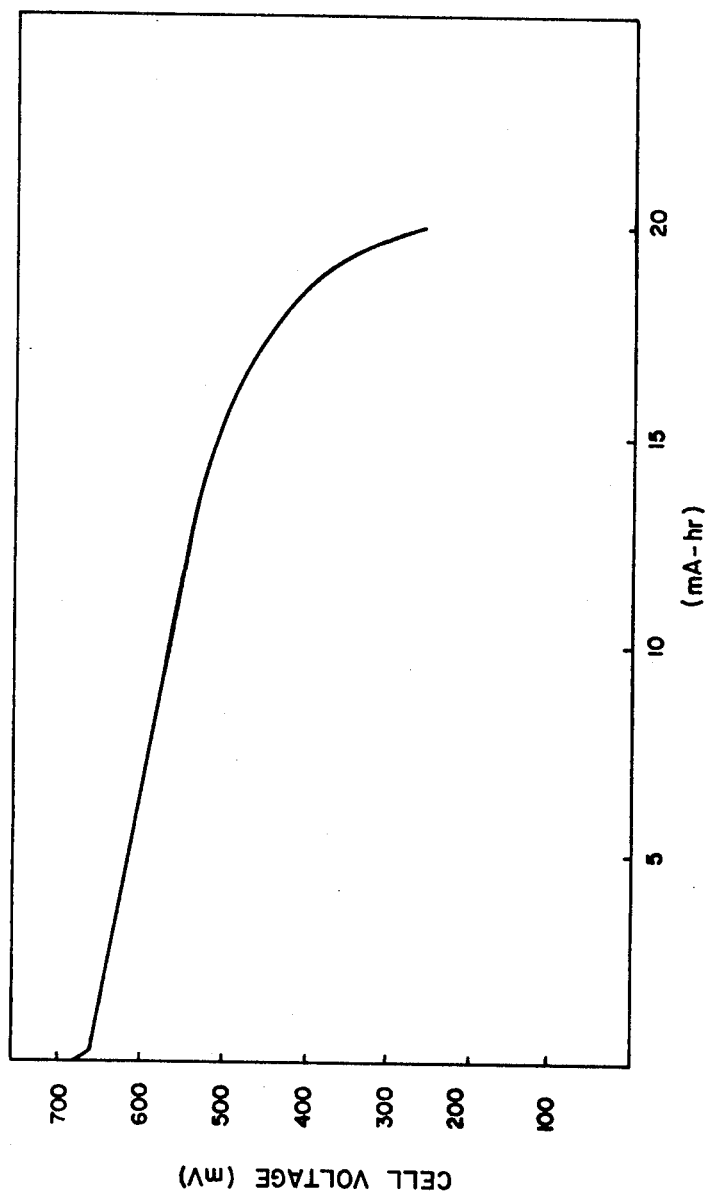
FIG. 2 shows in graphical form details of experimental results obtained from the cell of FIG. 1.

For the initial discharge cycle the cell was discharged through a 2,75 kΩ load. Discharge current varied from 200 μA to 100 μA over a 136 hour period. The discharge curve is given in FIG. 2.

In a second experiment the same cell was charged for 8.0 mA-hr at a constant current of 50 μA. The cell was then discharged at a constant current of about 80 μA to a voltage of 175 mV. The discharge capacity was 7.9 mA-hr and indicates the reversibility of the zeolite:$I_2$ electrode. This cell is still in operation.

Figure 3:
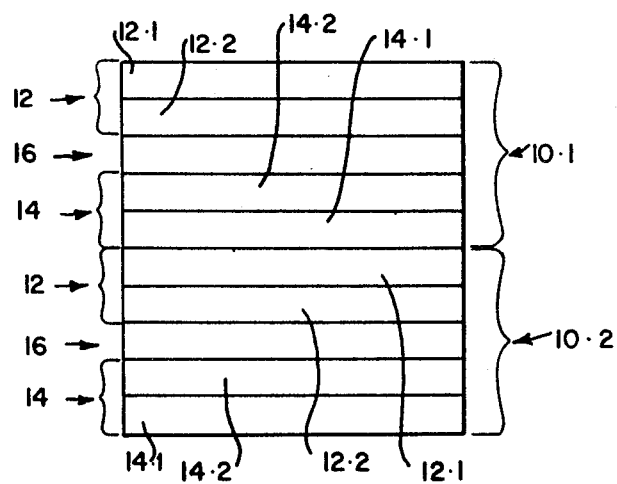
FIG. 3 shows a diagrammatic representation of a battery in accordance with the invention.

With reference to FIG. 3 of the drawings, reference numeral 18 generally designates a battery in accordance with the invention. In FIG. 3 of the drawings, the same reference numerals are used as in FIG. 2, unless otherwise specified. In this battery, two cells 10.1, 10.2 in accordance with FIG. 1 were connected by being compacted in series as shown. This battery gave an open circuit voltage of 1.310 V and a short circuit current of 10 mA/cm$^2$. The overall mass of the battery was 3.4 gm.

This embodiment of the invention provides the advantages of a cell which can operate at room temperature, the zeolite holding the iodine captive for effective operation of the cell.

Further advantages are that a cell of this type has a long shelf life and can be assembled in miniaturized form.

The cell of this invention may have application as a primary cell particularly where a relatively low energy density and a small overall size is required.

Where the cell can be recharged satisfactorily, the cell will have application as a secondary cell.

We claim:

1. An electrochemical cell comprising an anode, a solid electrolyte and a cathode, the anode comprising one or more materials selected from the group consisting of silver, silver amalgams, silver alloys, copper, copper amalgams and copper alloys, the cathode comprising an electronegative element selected from the group consisting of the halogens, the chalcogens and phosphorus sorbed in a molecular sieve carrier having a pore size of less than 1 micron, and the solid electrolyte comprising a double or multiple salt system having a silver or copper halide as one of its components.

2. A cell as claimed in claim 1, in which the anode comprises silver or copper in finely dispersed or powdered form.

3. A cell as claimed in claim 2, in which the silver or copper is mixed with solid electrolyte powder to reduce contact resistance between the anode and the electrolyte during use.

4. A cell as claimed in claim 1, in which the anode comprises a silver or copper disc.

5. A cell as claimed in claim 4, in which the silver or copper of the disc is in the form of an amalgam.

6. A cell as claimed in claim 1, in which the electronegative element is selected from the group consisting of chlorine, bromine, iodine, fluorine, sulphur, selenium, tellurium and phosphorus, the molecular sieve carrier being capable of holding the electronegative element captive during operation of the cell to combat significant loss of electronegative element and to combat degradation of the electrolyte.

7. A cell as claimed in claim 6, in which the electronegative element is in the form of iodine or sulphur.

8. A cell as claimed in claim 1, in which the cathode includes solid electrolyte to reduce contact resistance between the cathode and the electrolyte during use.

9. A cell as claimed in claim 1, in which the molecular sieve carrier is such that the electronegative element, when sorbed therein, is held therein in finely dispersed atomic, molecular, atomic cluster or molecular cluster form.

10. A cell as claimed in claim 1, in which the molecular sieve carrier comprises a molecular sieve material selected from the group consisting of carbon molecular sieves (excluding intercalation compounds of graphite) composite carbon molecular sieves and zeolites.

11. A cell as claimed in claim 10, in which the molecular sieve carrier comprises at least partially dehydrated zeolite crystals.

12. A cell as claimed in claim 11, in which the molecular sieve carrier is selected from the group of naturally occurring or synthetic zeolites consisting of faujasite, erionite, zeolite 3A, zeolite 4A, zeolite 5A, and zeolite 13X.

13. A cell as claimed in claim 12, in which the cathode includes a suitable electron-conductive material to enhance the electron conductivity of the cathode.

14. A cell as claimed in claim 13, in which the electron-conductive material is selected from the group consisting of graphite and $MoS_2$.

15. A cell as claimed in claim 14, in which the electron-conductive material is graphite in the form of a porous coating on the zeolite crystals, or in the form of a powder mixed with the zeolite crystals.

16. A cell as claimed in claim 15, in which the electron-conductive material is in the form of graphite powder mixed with the zeolite crystals, the cathode including between 5% and 30% by weight of graphite powder.

17. A cell as claimed in claim 15, in which the electron-conductive material is in the form of a porous coating of graphite on the zeolite crystals, formed by coating the zeolite crystals with colloidal graphite suspension followed by drying.

18. A cell as claimed in claim 17, in which the solid electrolyte includes a double salt comprising silver iodide and a compound selected from the group consisting of rubidium iodide, N,N,N,N',N',N'-hexamethyl-1,2-ethylene diamine diiodide, N,N,N,N',N',N'-hexamethyl-1,2-propylene diamine diiodide, N,N,N,N',N',N'-hexamethyl-1,3-propylene diamine diiodide, N,N,N,N',N'',N'',N''-heptamethyl-N'-hydro-diethylenetriamine triiodide and tetramethyl ammonium iodide.

19. A cell as claimed in claim 1, in which the solid electrolyte includes a double salt comprising a silver halide and the halide of another cation.

20. A cell as claimed in claim 1, in which the solid electrolyte includes a double salt comprising of a silver halide and another silver salt containing a different anion.

21. A cell as claimed in claim 1, in which the solid electrolyte includes a multiple salt comprising halides and chalcogenides.

22. A cell as claimed in claim 1, in which the solid electrolyte includes a double or multiple salt comprising a cuprous halide with a halide and/or chalcogenide of another cation.

23. A cell as claimed in claim 22, in which the solid electrolyte includes a double salt comprising a cuprous halide and an amine halide.

24. A cell as claimed in claim 1, in which the molecular sieve carrier has a pore size of less than 0,1 micron.

25. A battery comprising a plurality of cells, as claimed in claim 1, connected together.

* * * * *